May 5, 1931.   J. S. KUBACKI   1,804,348

NUT LOCK

Filed Sept. 20, 1929

John S. Kubacki INVENTOR

BY Victor J. Evans

HIS ATTORNEY.

UNITED STATES PATENT OFFICE

JOHN S. KUBACKI, OF CHICAGO, ILLINOIS

NUT LOCK

Application filed September 20, 1929. Serial No. 393,997.

This invention relates to certain novel improvements in nut locks and has for its principal object the provision of an improved construction of this character which will be highly efficient in use and economical in manufacture.

One of the many objects of this invention is to provide an expeditious and compact arrangement for retaining a nut in place upon a bolt or other threaded member whereby the nut cannot be dislodged due to vibration or other causes other than by manual manipulation.

A still further object of this invention is to provide an arrangement for retaining a nut in an assembled position upon a threaded bolt or other threaded member which while efficiently functioning to prevent displacement or dislodgment due to vibration or other causes will not interfere with the threading of the nut from or upon the threaded bolt or other threaded member.

Other objects will appear hereinafter.

The invention consists in the novel combination and arrangement of parts to be hereinafter described and claimed.

The invention will be best understood by reference to the accompanying drawings, showing the preferred form of construction and in which.

Figure 1:
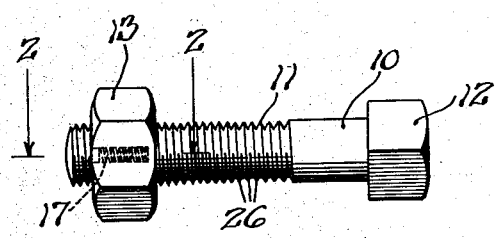
Fig. 1 is a typical side elevational view of a nut and bolt assembly showing my novel nut retaining means associated with the nut thereof.

Referring more particularly to the drawing 10 indicates a member in the form of a bolt having a partially threaded shank portion 11 and a head 12. Upon this threaded shank 11 is adapted to be threaded a nut 13.

This nut 13 has the usual central bore 14 with its cylindrical wall having formed therein threads 15 which are of the same pitch and depth of the threaded shank 11.

My improved nut retainer or lock is associated with this nut 13 in the following manner.

From one face 16 of the nut a hole or bore 17 is formed in the nut with the inner depth of the hole or bore 18 terminating a substantial distance from the opposite face 19 of the nut whereby to provide a sufficient wall 20 forming the bottom of the hole or bore.

Figure 3:
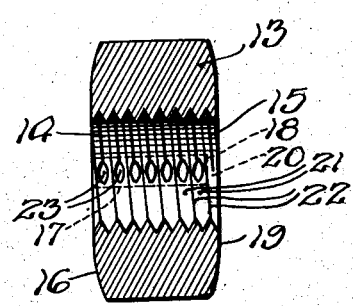
Fig. 3 is a cross sectional detail view of the nut as shown in Figs. 1 and 2.

As best shown in Fig. 3 the hole or bore is formed in the nut so as to partially pass through the routes 21 of the threads 15 so as to provide between each apex 22 of the threads a lateral opening 23 which opens into the bore 17.

Figure 2:
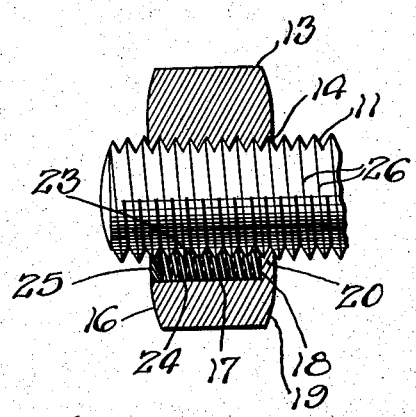
Fig. 2 is a fragmentary sectional detail view of the same taken substantially on line 2—2 of Fig. 1.

Mounted in the bore 17 is a spring member 24. This spring member 24 is confined or concealed in the bore by means of a plug 25 as shown in Fig. 2. Certain convolutions of the spring member 24 will project through the openings 23 between the apexes 22.

The nut is threaded upon the shank 11 and during this threading operation the apexes 26 of the threaded shank 11 will spread adjacent convolutions that project through the lateral openings 23 and as the member 24 which is mounted in the bore 17 is in the form of a spring the resiliency of the spring 24 will resist this spreading of the convolutions and therefore will yieldably bear the convolutions against the threads of the threaded shank 11 and removably bind the nut upon the shank 11 thereby preventing displacement by reason of the causes herein mentioned.

It will be thus seen that I have provided a very simple and economical arrangement to accomplish that which has been accomplished by more elaborate and expensive arrangements for retaining a nut upon a threaded member.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. Means for retaining a nut upon a threaded member comprising a nut provided with a bore directed through the routes of the threads of said member whereby to provide lateral openings opening into said bore, a spring member confined in said bore with portions thereof exposed through said lateral openings between the apexes of the threads of said nut for yieldable and resistable bearing against the threads of said threaded member when said nut is assembled upon said threaded member.

2. Means for retaining a nut upon a threaded member comprising a nut provided with a bore directed through the routes of the threads of said member whereby to provide lateral openings opening into said bore, a spring member confined in said bore with portions thereof exposed through said lateral openings between the apexes of the threads of said nut for yieldable and resistable bearing against the threads of said threaded member when said nut is assembled upon said threaded member, and a plug for the open end of said bore.

In testimony whereof I affix my signature.

JOHN S. KUBACKI.